(12) United States Patent
Rowe (10) Patent No.: US 7,562,443 B2
(45) Date of Patent: Jul. 21, 2009

(54) AUTOMATIC BOX SPRING FASTENING APPARATUS

(76) Inventor: Brian A. Rowe, 3032 Ousley Gap Rd., Barboursville, WV (US) 25504

( * ) Notice: Subject to any disclaimer, the term of this patent is extended or adjusted under 35 U.S.C. 154(b) by 341 days.

(21) Appl. No.: 11/128,689

(22) Filed: May 13, 2005

(65) Prior Publication Data

US 2006/0265850 A1 Nov. 30, 2006

(51) Int. Cl.
*B23P 19/00* (2006.01)
*B68G 7/00* (2006.01)

(52) U.S. Cl. .......................... 29/798; 29/91.1; 29/432; 29/700; 227/2; 227/5; 227/30; 227/110; 227/152; 227/153

(58) Field of Classification Search .................. 29/432, 29/798, 91.1, 33 K, 281.6, 700; 227/153, 227/152, 159, 50, 30, 29, 28, 37, 40, 110, 227/100, 2, 5
See application file for complete search history.

(56) References Cited

U.S. PATENT DOCUMENTS

| | | | |
|---|---|---|---|
| 1,392,222 A | 9/1921 | Rasmussen | |
| 2,884,637 A * | 5/1959 | Wandel | 227/3 |
| 3,168,745 A | 2/1965 | Winters | |
| 3,190,522 A | 6/1965 | Winters | |
| 3,717,924 A | 2/1973 | Kennedy | |
| 3,770,180 A | 11/1973 | Stumpf | |
| 3,789,495 A | 2/1974 | Stumpf | |
| 3,984,040 A * | 10/1976 | Fry | 227/7 |
| 4,039,111 A | 8/1977 | Rogers | |
| 4,441,643 A | 4/1984 | McCutchen | |
| 4,708,276 A | 11/1987 | Knoth et al. | |
| 5,058,795 A | 10/1991 | Tonus | |
| 5,095,605 A * | 3/1992 | Tonus | 29/432 |
| 5,249,352 A | 10/1993 | Landers | |
| 5,497,541 A * | 3/1996 | Nogueira | 29/33 K |
| 5,792,309 A * | 8/1998 | Eto | 156/517 |
| 5,904,789 A | 5/1999 | Durkos | |
| 6,220,494 B1 * | 4/2001 | Raffoni | 227/2 |
| 6,499,206 B1 | 12/2002 | Eure et al. | |
| 6,935,546 B2 * | 8/2005 | Durkos | 227/110 |
| 7,222,402 B1 * | 5/2007 | Durkos | 29/91.1 |

(Continued)

OTHER PUBLICATIONS

U.S. Appl. No. 10/306,231, filed May 29, 2003, Durkos.

*Primary Examiner*—Essama Omgba
(74) *Attorney, Agent, or Firm*—Waters Law Group; Robert R. Waters; Olen L York, III (57) ABSTRACT

A method and apparatus for assembling box springs for use in bedding applications. The apparatus comprises a base for supporting a frame and a spring unit, a framework with a plurality of tools coupled thereto. Each tool has an associated module adjuster coupled thereto. A vertical drive mechanism provides relative movement between the tools and the base where the tools may be disposed between a first vertical position and a second vertical position. A horizontal drive mechanism provides relative horizontal movement between the tools and the base. Each tool is configured to secure a respective module of a row of the spring unit to a corresponding target location on the frame when disposed in the second vertical position and each module adjuster is configured to align a respective module with a corresponding fastening location when the tool is disposed in the second vertical position.

16 Claims, 12 Drawing Sheets

U.S. PATENT DOCUMENTS

2005/0210647 A1* 9/2005 Durkos .................. 29/91.1
2005/0251981 A1* 11/2005 Mossbeck et al. ............ 29/91.1
2006/0265850 A1* 11/2006 Rowe .................. 29/432

* cited by examiner

AUTOMATIC BOX SPRING FASTENING APPARATUS

BACKGROUND OF THE INVENTION

Box springs for use in bedding applications have been constructed a variety of ways. Typically, individual coils or a spring units having a plurality of modules are secured to a frame either through the use of hand tools or semi-automated or automated processes. The prior art fails to teach or suggest a box spring fastener apparatus or method of the present invention.

BRIEF DESCRIPTION OF THE DRAWING

While the specification concludes with claims which particularly point out and distinctly claim the invention, it is believed the present invention will be better understood from the following accompanying drawings, in which:

DETAILED DESCRIPTION OF THE INVENTION

Figure 1:
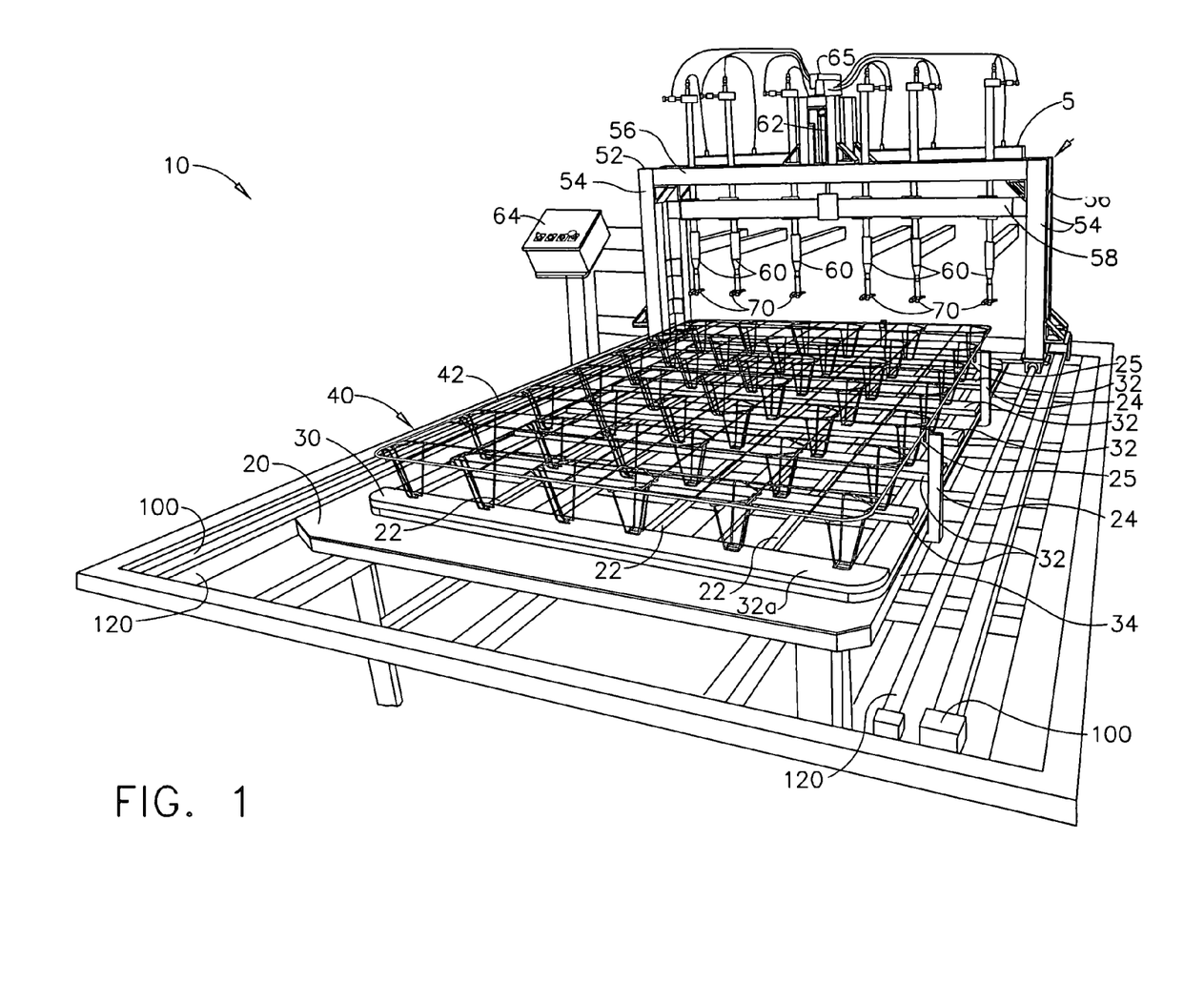
FIG. 1 is a perspective view of a box spring fastening apparatus constructed in accordance with the present invention.
Figure 2:
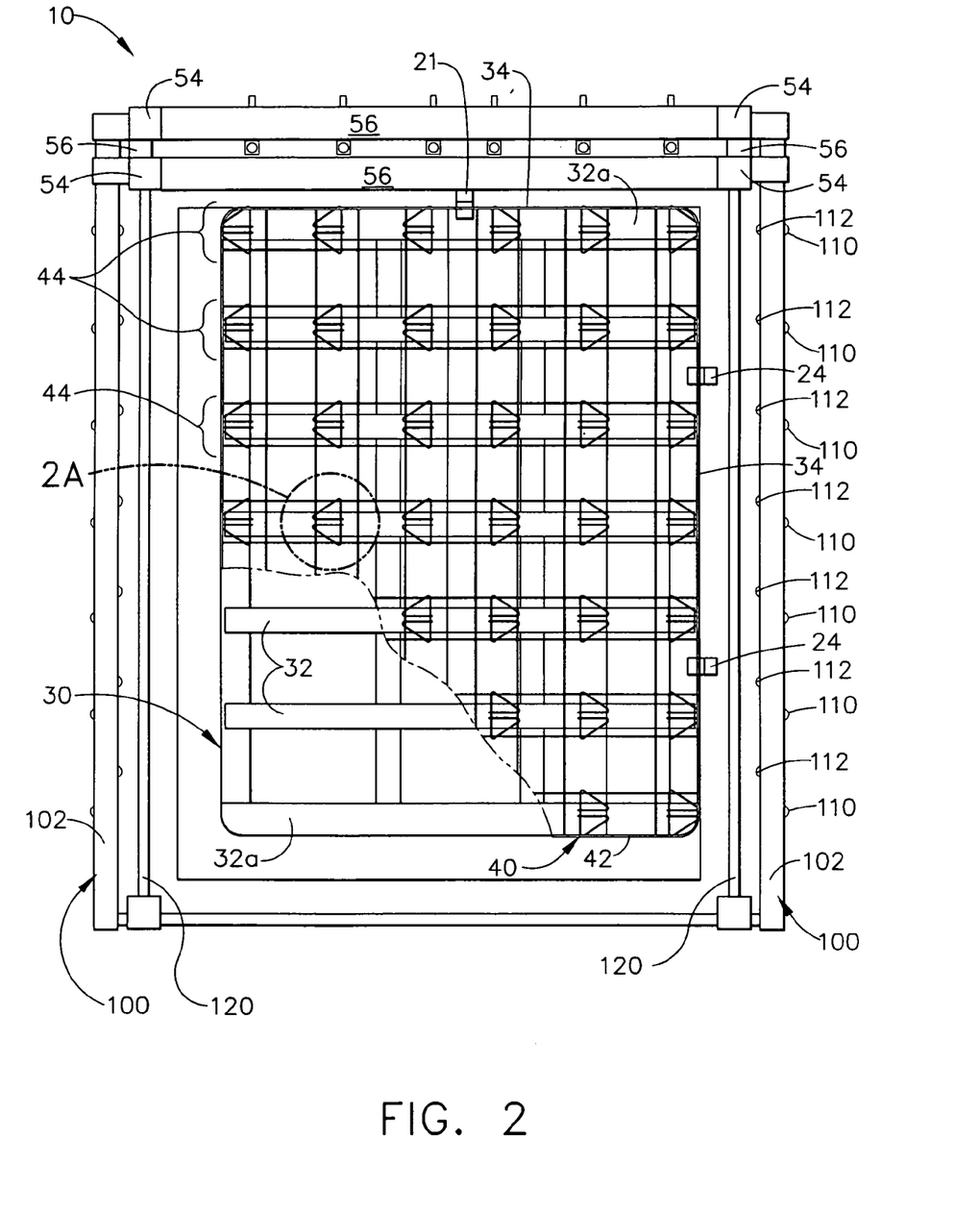
FIG. 2 is a top view of the box spring fastening apparatus of FIG. 1.

Referring now to the figures, FIG. 1 and FIG. 2 depict an embodiment of box spring fastening apparatus 10. Apparatus 10 includes base 20 for supporting frame 30 having a plurality of interior slats 32 and two perimeter slats 32a, and spring unit 40. Base 20 may include raised rails 22 for supporting interior slats 32 of a frame 30. In one embodiment, as shown in FIG. 1 and FIG. 2, three jigs 24 may be spaced about base 20 at desired locations of outer perimeter 34 of frame 30 such that frame 30 may be positioned squarely atop base 20 by engaging at least two adjacent portions of perimeter 34 of frame 30 against each jig 24. While three jigs 24 are shown, it should be appreciated that any number of jigs 24 may be employed. Alternatively, an operator may place frame 30 atop base 20 and approximate the desired location of frame 30 without the use of such jigs 24; further, base 20 may include markings thereon to assist an operator in positioning frame 30 at a desired location.

Figure 2A:
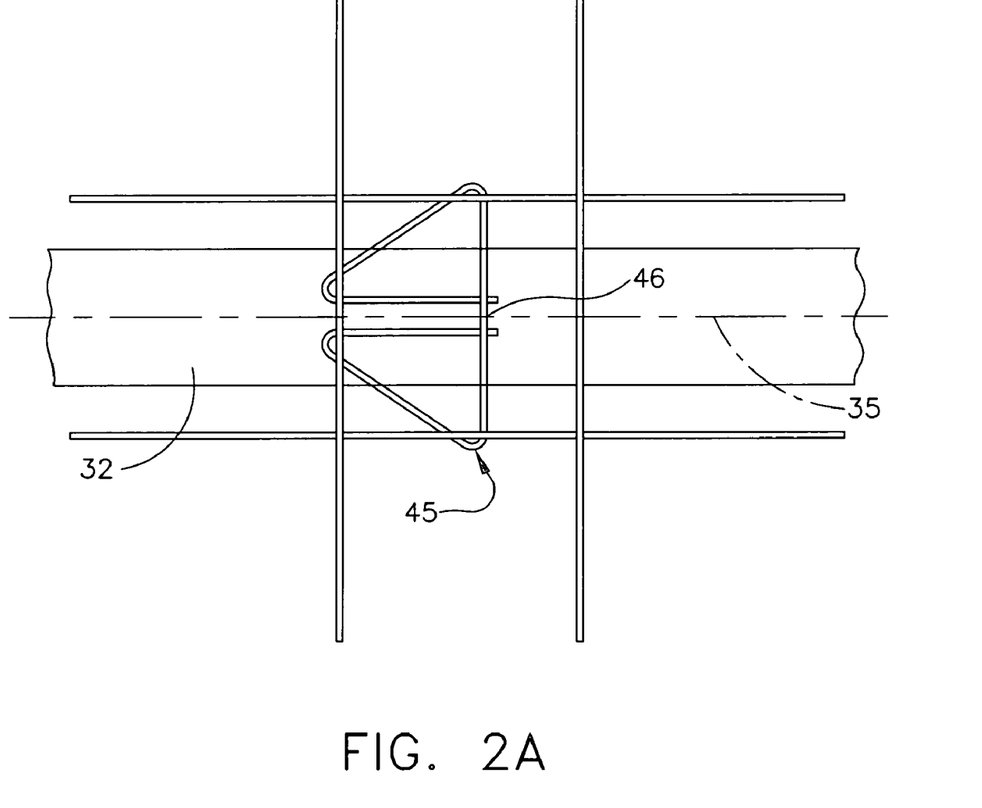
FIG. 2A is an enlarged fragmentary view of the box spring fastening apparatus of FIG. 2.

In addition, each jig 24 may also include clasp 25 for engaging borderwire 42 of spring unit 40 such that spring unit 40 may be in a desired position substantially square atop frame 30 such that each row 44 of modules of spring unit 40 may be positioned atop a corresponding slat 32, 32a of frame 30. Alternatively, an operator may place spring unit 40 atop frame 30 and approximate the desired location of spring unit 40 without the use of such clasps 25. In the exemplary embodiment, as shown in FIG. 2A, the target fastening locations on slats 32, 32a of frame 30 are defined by the position of cross-wire 46 of each module 45 when spring unit 40 is properly positioned atop frame 30 with the cross-wire 46 of each module 45 at a corresponding slat 32, 32a and located substantially on or in close proximity to the longitudinal midline 33 of the slat 32, 32a.

Apparatus 10 includes framework 50 which may comprise gantry 52. Gantry 52 may be comprised of four vertical support members 54 and four horizontal support members 56. Horizontal support members 56 may be disposed between and rigidly secured near the top of vertical support members 54 to form a bridge-like structure. Horizontal support members 56 and vertical support members 54 may be comprised of metal weldment, structural metal profile, such as extruded aluminum profile, structural composite material, or the like. While four vertical support members 54 and four horizontal support 56 members are shown in the exemplary embodiment, it should be appreciated that as little as two vertical support members 54 and as little as one horizontal support member 56 may be used; conversely, more than four vertical support members 54 and more than four horizontal support members 56 may be used.

Gantry 52 may also include vertically reciprocating carriage 58 disposed between vertical support members 54 and substantially parallel with horizontal support members 56. A plurality of pneumatic staplers 60 may be coupled to carriage 58, further described below. Vertical drive mechanism 62, rigidly secured to one or more of horizontal support members 56, may move carriage 58 between a raised position wherein carriage 58 is near the top of the vertical support members 54, as illustrated in FIG. 1, and a lowered position wherein each stapler 60 is positioned at a corresponding target fastening location on slat 32 or 32a of frame 30 atop base 20. Alternatively, gantry 52 may include a plurality of vertically reciprocating carriages wherein the plurality of staplers are distributed among the carriages. In yet another alternative embodiment, the staplers may be rigidly secured to the framework, and the base moved by a vertical drive mechanism coupled thereto from a first position furthest from the staplers to a second position wherein each stapler is positioned at a corresponding target fastening location on a slat of a frame atop the base. Vertical drive mechanism 62 may be a double-acting fluid piston assembly, a DC motor, or any suitable mechanism.

The activation and deactivation of vertical drive mechanism 62 may be controlled by control unit 64. A switch at the raised position of the carriage 58 and a switch at the lowered position of the carriage 58 may communicate the raised or lowered position of the carriage 58 to the control unit 64. The switches may be coupled to a vertical support member 54, the carriage 58, or the vertical drive mechanism 62. Each switch may be a mechanical switch, such as a micro switch or a reed switch, or an ultrasonic sensor, an infrared sensor, an optical sensor, or any suitable device.

The number of staplers 60 secured to framework 50 is preferably equal to the number of modules 45 per row 44 of the spring unit 40 for the largest box spring for construction. In the exemplary embodiment, six staplers 60 are carried by the gantry 52 which are used to secure six modules 45 per row 44 for a queen-size box spring. Staplers 60 may be releasably secured to framework 50 such that each stapler 60 may be laterally positioned on framework 50 to accommodate a variety of spring units with different distances between each module 45 of a row 44. Staplers 60 may be laterally positioned manually or may be coupled to an indexing motor, or the like, and positioned automatically via instructions from control unit 64. Also, in some instances, the number of modules 45 per row 44 may be less than the number of staplers 60; the extra stapler(s) 60, which will be inactivate during operation, may be positioned near a far end of carriage 58 or removed from carriage 58. Each stapler 60 may be in fluid communication with air manifold 59 connected to a source of pressurized fluid. In addition, each stapler 60 may have an associated individual switch, for controlling the activation of the stapler 60, within switch bank 65. Each switch of switch bank 65 may be in communication with control unit 64 such that each stapler 60 may be activated independently from one another. While pneumatic staplers 60 are shown in the exemplary embodiment, it should be appreciated that alternatively powered staplers may be used, as well as other suitable fastening tools, such as a nail guns, glue dispensers, welding guns, or the like.

Figure 3:
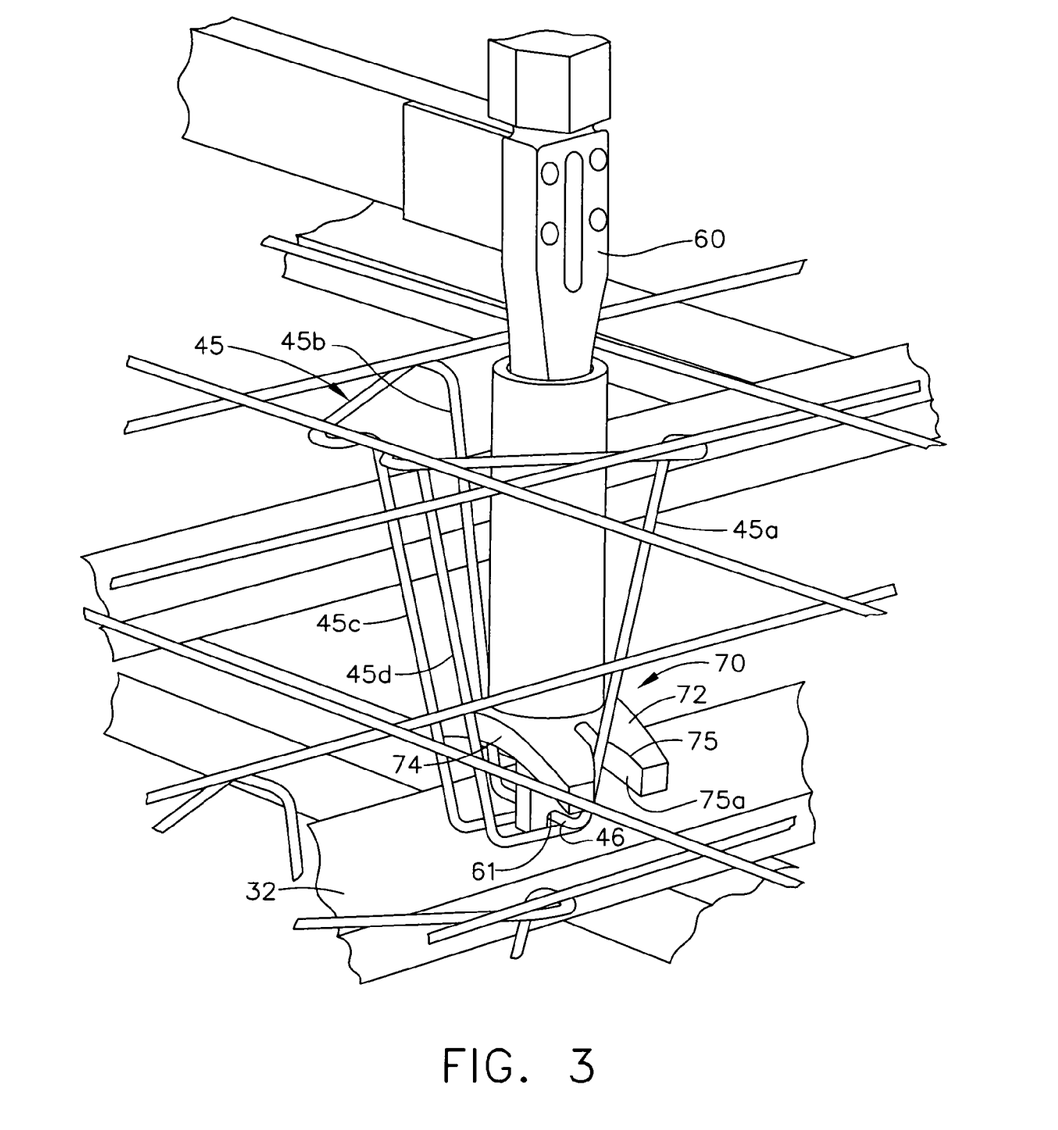
FIG. 3 is a perspective view of a module adjuster.
Figure 3A:
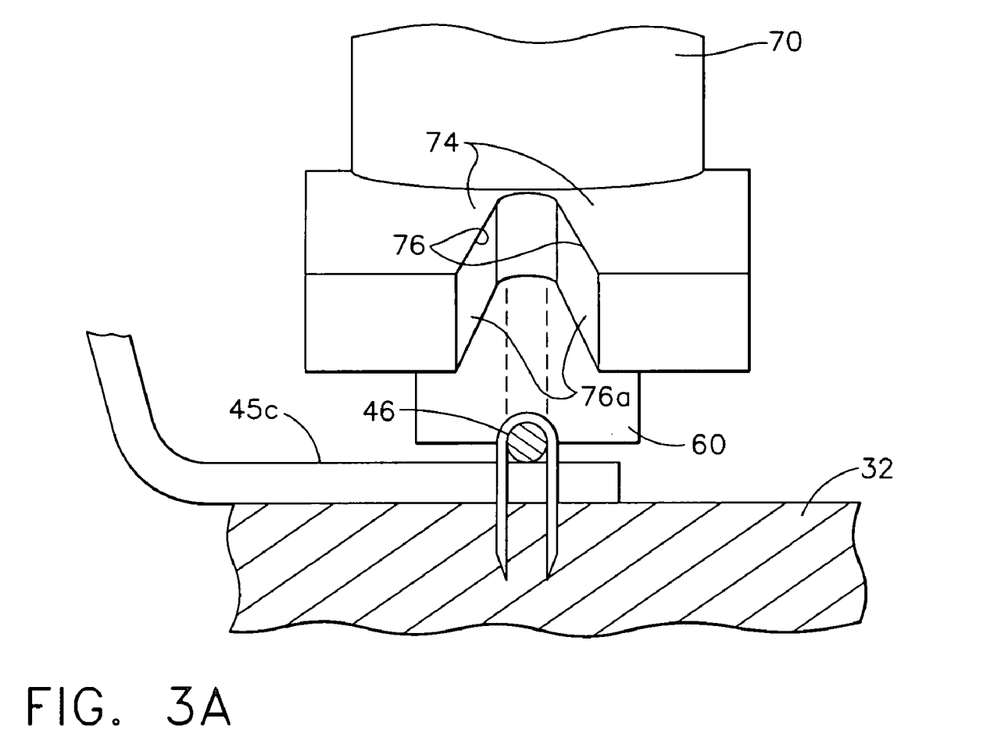
FIG. 3A is a fragmentary front view of the module adjuster of FIG. 3.
Figure 3B:
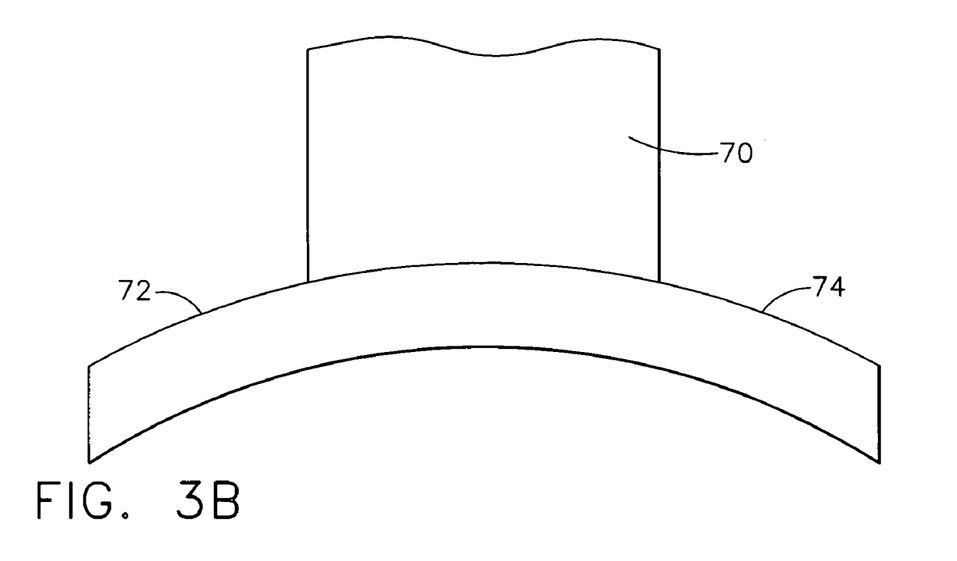
FIG. 3B is a fragmentary side view of the module adjuster of FIG. 3.
Figure 3C:
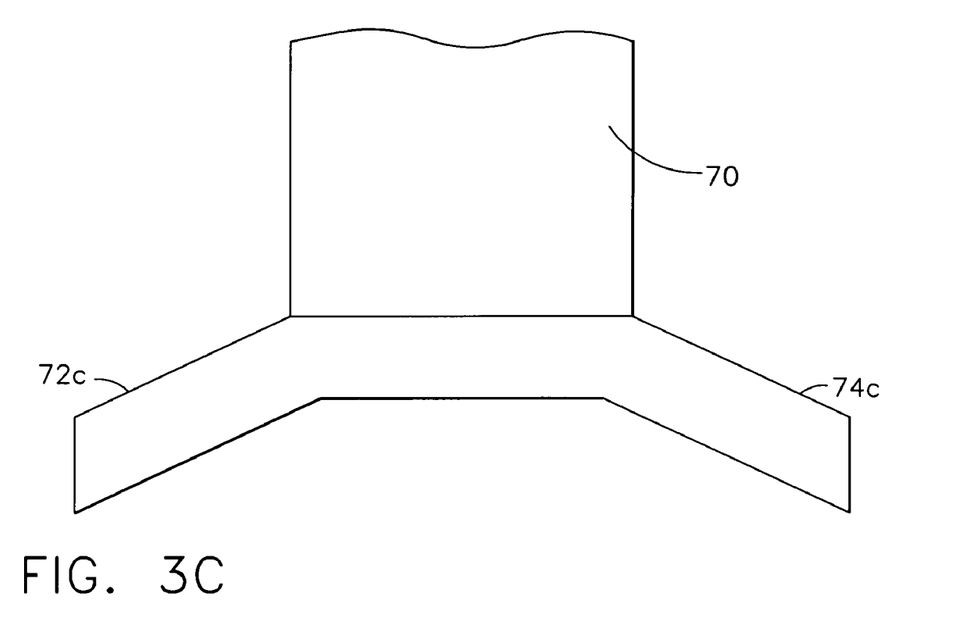
FIG. 3C is a fragmentary side view of another embodiment of a module adjuster.
Figure 3D:
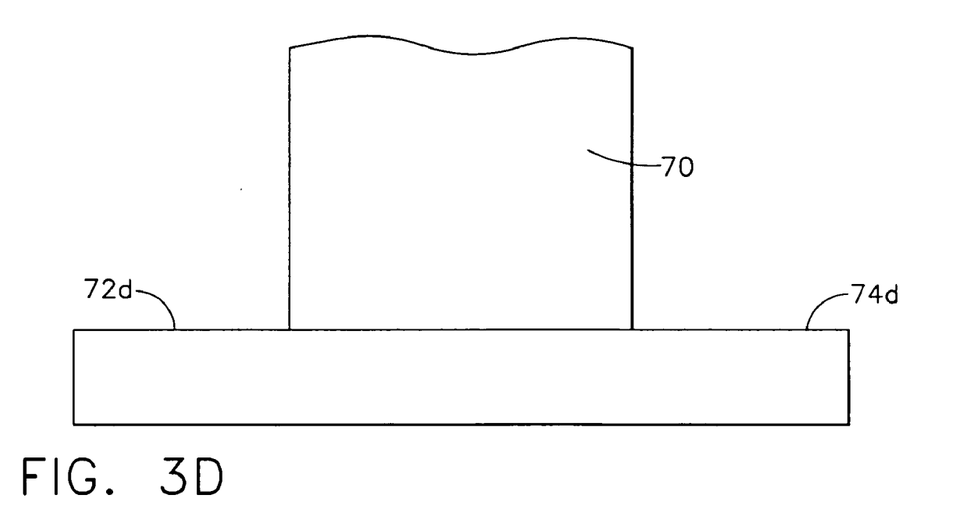
FIG. 3D is a fragmentary side view of another embodiment a module adjuster.

Also, each stapler 60 may have module adjuster 70 coupled thereto. Module adjusters 70 are configured to engage misaligned modules 45 and align them with a corresponding target fastening locations on slats 32 or 32a of frame 30 as the staplers 60 are lowered towards a corresponding target fastening location. For example, FIG. 3, FIG. 3A and FIG. 3B illustrate one embodiment of module adjuster 70. Module adjuster 70 includes first and second semi-annular flanges 72 and 74. Each flange 72 and 74 has V-shaped notch portions 75 and 76, respectively. Each notch 75 and 76 includes inner surface 75a and 76a. As stapler 60 is lowered to a target fastening location on a slat 32 or 32a, legs 45a and 45b of a misaligned module 45 may be engaged by the inner surface of each notch 75a and 76a such that module 45 will be moved laterally to the target fastening location as stapler 60 is further lowered. When stapler 60 has been lowered to the target fastening location, cross-wire 46 of module 45 will be engaged by slot 61 of stapler 60 and held in alignment with target fastening location of slat 32 or 32a. Cross-wire 46 of module 45 may then be stapled to the target fastening location on slat 32 or 32a. While semi-annular flanges 72 and 74 are shown in FIG. 3, FIG. 3A and FIG. 3B, as shown in FIG. 3C flanges 72c and 74c maybe substantially flat and at an obtuse angle to one another; however, while an obtuse angle is shown, it should be appreciated that the angle between flanges 72c and 74c may be between about 30 degrees and about 180 degrees. Also, as shown in FIG. 3D, flanges 72d and 74d may be substantially co-planar. Module adjuster 70 may be comprised of any suitably rigid material such as metal, plastic, and the like.

Figure 4:
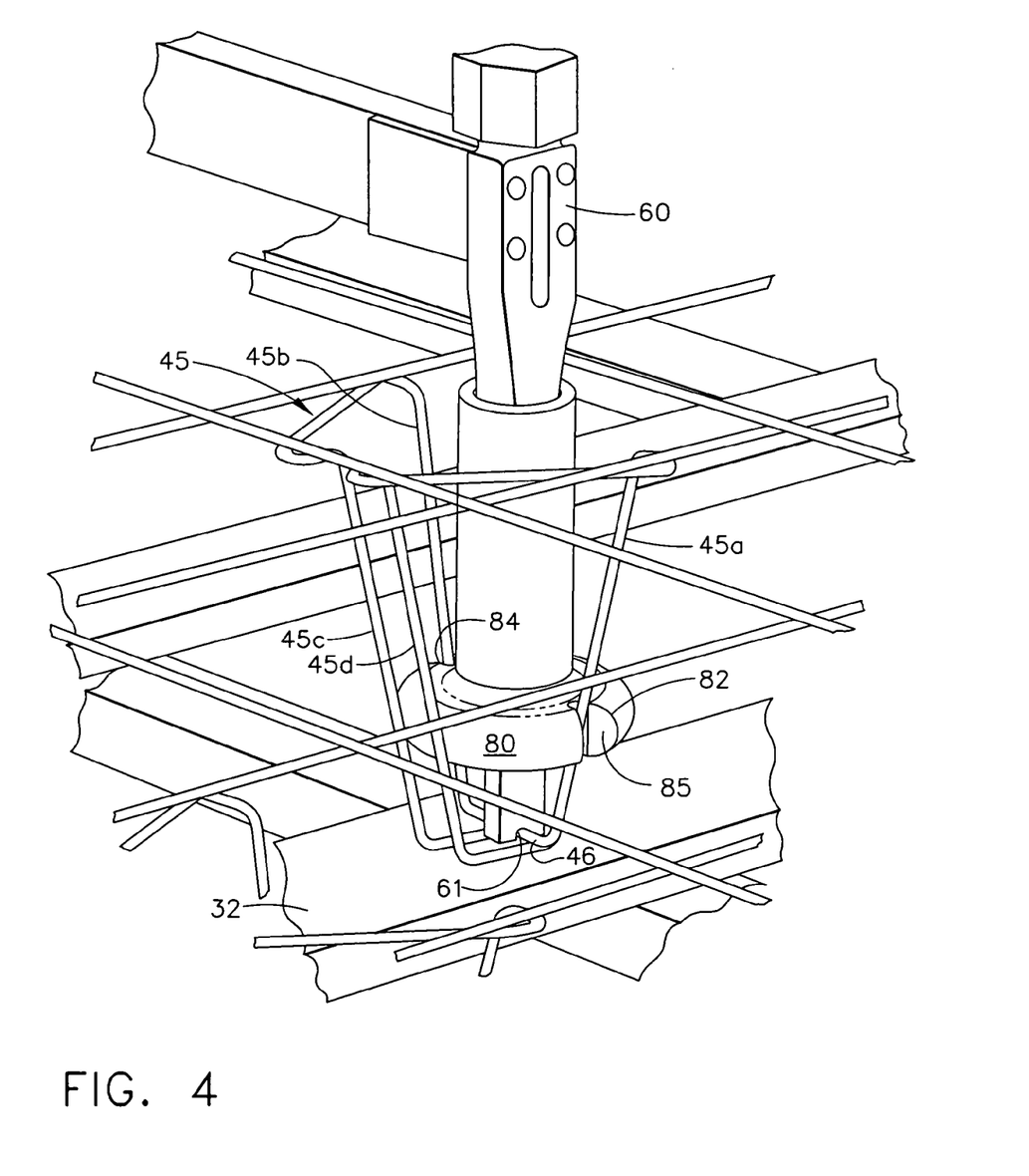
FIG. 4 is a perspective view of a safety shield.
Figure 5:
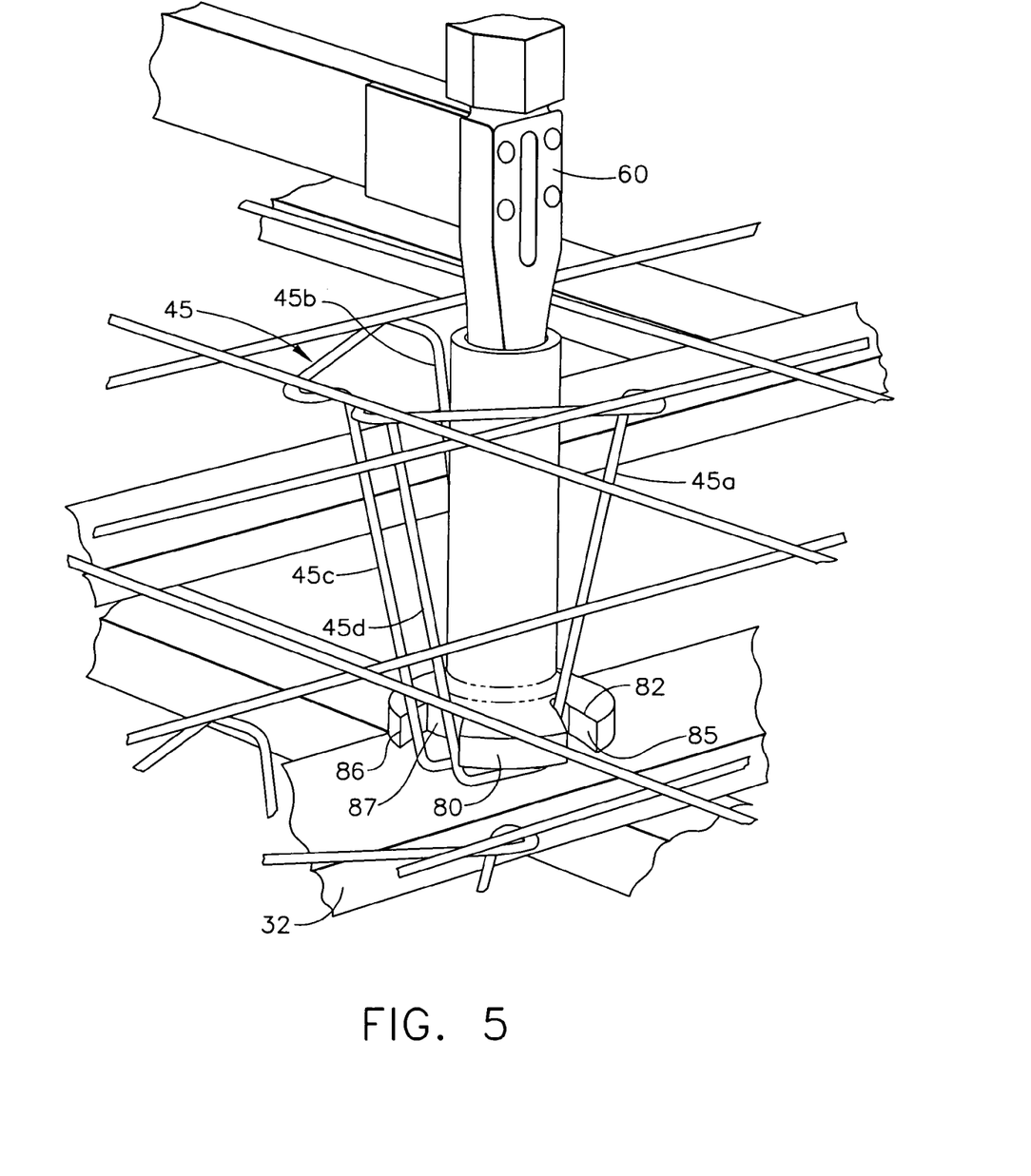
FIG. 5 is a perspective view of an alternative embodiment of a safety shield.

Referring now to FIG. 4 and FIG. 5 showing safety shield 80 coupled to the end of stapler 60. Safety shield 80 may be configured to deflect misfired staples from projecting upwardly into the area surrounding the apparatus and potentially harming the operator or other person. Additionally, safety shield 80 may function as a module adjuster having two V-shaped notch portions 82 and 84. Each notch 82 and 84 is defined by inner surface 85 (the inner surface for notch 84 is not shown). As stapler 60 is lowered to a target fastening location on slat 32 or 32a, legs 45a and 45b of a misaligned module 45 may be engaged by inner surface 85 of each notch 82 and 84 such that module 45 may be moved laterally to the target fastening location as stapler 60 is further lowered. As shown in FIG. 5, safety shield 80 may include third notch 86 having an inner surface 87, which may engage inclined legs 45c and 45d of a misaligned module 45 such that module 45 may be moved laterally to the target fastening location as stapler 60 is further lowered. Safety shield 80 may be comprised of any suitably rigid material such as metal, plastic, and the like.

Figure 6:
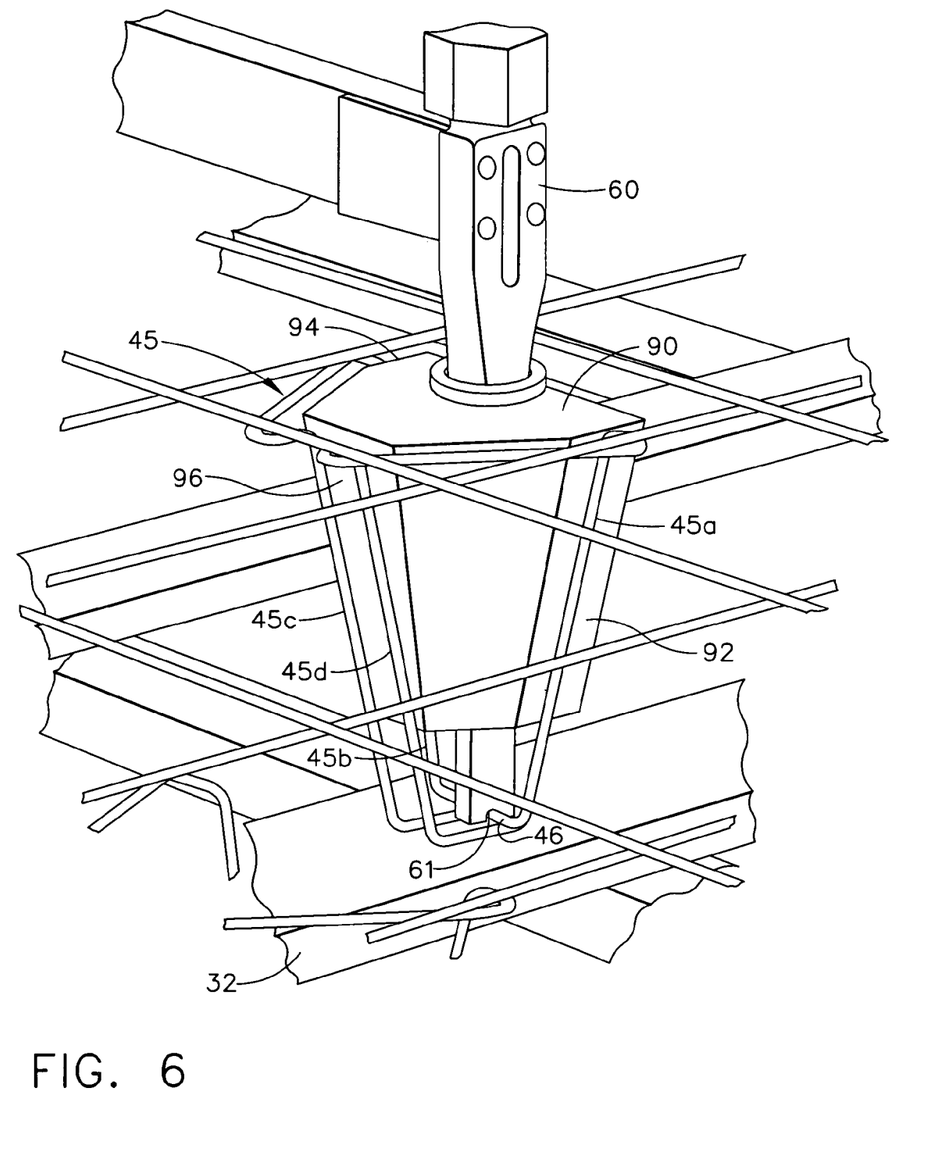
FIG. 6 is a perspective view of a module adjuster.

Referring now to FIG. 6, module adjuster 90 may be configured to have a shape complimentary to the interior of module 45. Module adjuster 90 may have two substantially parallel faces 92 and 94. As stapler 60 is lowered to a target fastening location on slat 32 or 32a, legs 45a and 45b of a misaligned module 60 may be engaged by face 92, 94 such that module 45 may be moved laterally to the target fastening location as stapler 60 is further lowered. Module adjuster 90 may also include third face 96 which may engage inclined legs 45c and 45d of a misaligned module 45 such that module 45 may be moved laterally to the target fastening location as stapler 60 is further lowered. Module adjuster 90 may be comprised of any suitably rigid material such as metal, plastic, and the like. While the modules depicted herein include legs 45a and 45b and inclined legs 45c and 45d, it should be appreciated that a module adjuster may be configured to be operable with spring units having a variety of module configurations. For example, module adjusters 70 and 90 and safety shields 80 heretofore described are suitable for use with modules having only legs 45a and 45b. Furthermore, a module adjuster may be configured to be operable with helical coil spring modules where the adjusters may be conical shaped and capable of laterally moving a module to a target fastening location. Other module configurations and module adjuster and safety shield configurations will be readily apparent to one skilled in the art.

Referring now to FIG. 1, FIG. 2, FIG. 7A and FIG. 7B, horizontal drive mechanism 100 may be coupled to gantry 52 to provide horizontal movement of gantry 52 relative to base 20. Alternatively, a horizontal drive mechanism may be coupled to base 20 to provide horizontal movement of base 20 below framework 50. In yet another alternative embodiment, base 20 may be a conveyor configured to support frame 30 and provide horizontal movement of frame 30 relative to framework 50. Conveyor may move an assembled box spring to a subsequent manufacturing process, a second conveyor, or the like. In the exemplary embodiment, horizontal drive mechanism 100 comprises a pair of rodless cylinders. Gusset brackets 104 may be used to couple each vertical support member 54 to external carriage 108 of rodless cylinder 100. While rodless cylinders 100 are shown in the exemplary embodiment, it should be appreciated that the horizontal drive mechanism may be any suitable device or configuration, such as a double-acting fluid piston assembly, a DC motor, or the like. Additionally, while horizontal movement of gantry 52 is shown as being parallel to length of frame 30, it should be appreciated that horizontal drive mechanism 100 may be configured such that gantry 52 is moved perpendicular to length of frame 30, or at some other angle relative to length of frame 30.

Figure 7A:
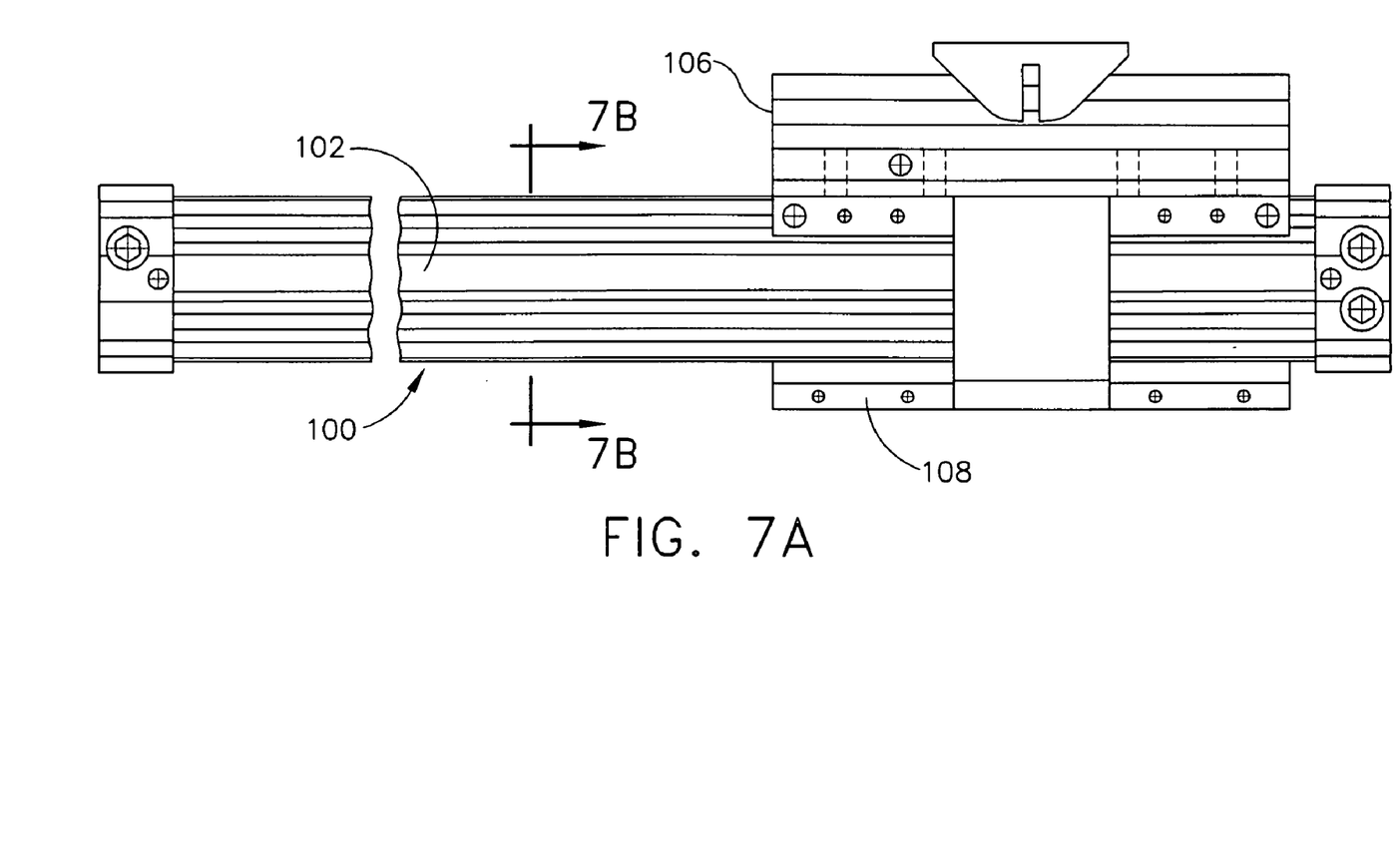
FIG. 7A is a side view of a rodless cylinder with a brake assembly.
Figure 7B:
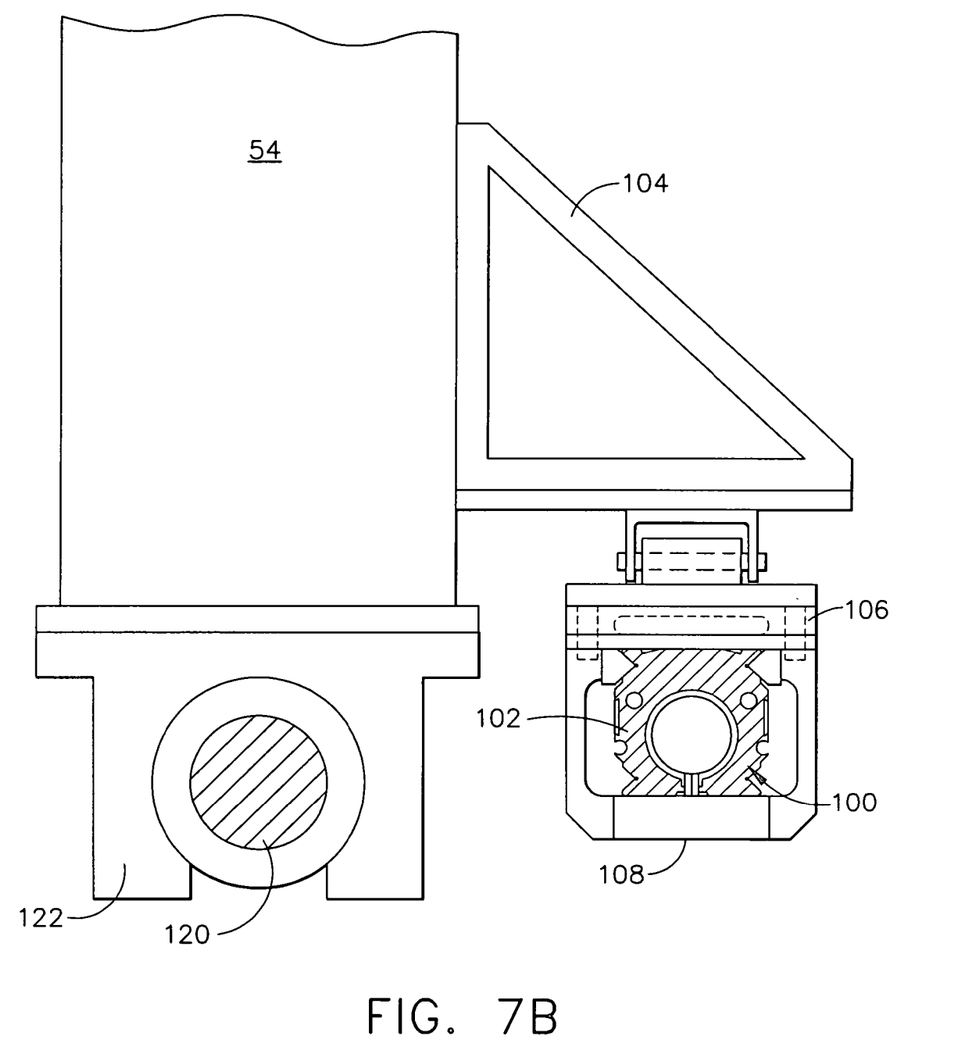
FIG. 7B is a cross-sectional view taken along line 7B-7B of FIG. 7A.

Referring now to FIG. 7A and FIG. 7B, the activation and deactivation of horizontal drive mechanism 100 may also be controlled by control unit 64. The relative position of framework 50 may be detected by a series of sensors 110, 112 in communication with control unit 64. In the exemplary embodiment, sensors 110, 112 are reed switches coupled to cylinder body 102 of rodless cylinder 100. Each sensor 110, 112 is positioned on cylinder body 102 to be co-linear with a longitudinal midline 33 of a slat 32, 32a of a potential frame 30 for construction. For example, as shown in FIG. 2, sensors 110 are positioned on cylinder body 102 to be co-linear with slats 32, 32a of frame 30 for a queen-sized or split-king box spring and sensors 112 are positioned on cylinder body 102 to be co-linear with the slats of a frame for a twin-sized or full-sized box spring. Sensors 110, 112 are shown in FIG. 2 as protruding from cylinder body 102 for the purposes of illustrating the position of sensors 110, 112 and it should be appreciated that it may be preferable that sensors 110, 112 be coupled to cylinder body 102 such that sensors 110, 112 set flush within a groove of cylinder body 102, and do not physically interfere with the movement of gantry 52. In an alternative embodiment, sensors 110, 112 may be coupled to the base 20 at points co-linear with longitudinal midlines 33 of slat 32 or 32a of a potential frame 30 for construction. In yet another embodiment, a sensor may be coupled to framework 50 and configured to sense markings on base 20 or slats 32, 32a. While reed switches have been described, it should be appreciated that other sensors may be employed such as alternative mechanical switches, for instance micro switches, or ultrasonic sensors, infrared sensors, optical sensors, or the like.

Pneumatically actuated brake 106 may be coupled to external carriage 108 of each rodless cylinder 100. Brakes 106 are operable to assist in ceasing horizontal movement of gantry 52 as well as stabilize gantry 52 when staplers 60 are activated. Control unit 64 may control the application and release of brakes 106. In the exemplary embodiment, each brake 106 comprises an Active Holding Brake System, Series 46000B/L3, available from Norgren® in Brookville, Ohio. However, it is appreciated that any braking system, pneumatically actuated or otherwise, capable of ceasing horizontal movement of the gantry and stabilizing the gantry when the staplers are activated will suffice.

Gantry 52 may also be partially supported and its horizontal movement guided by guide rods 120 disposed parallel to the rodless cylinders 100. Vertical support members 54 of the gantry 52 may be coupled to linear bearings 122 which slidingly engage the guide rods 120.

Figure 8:
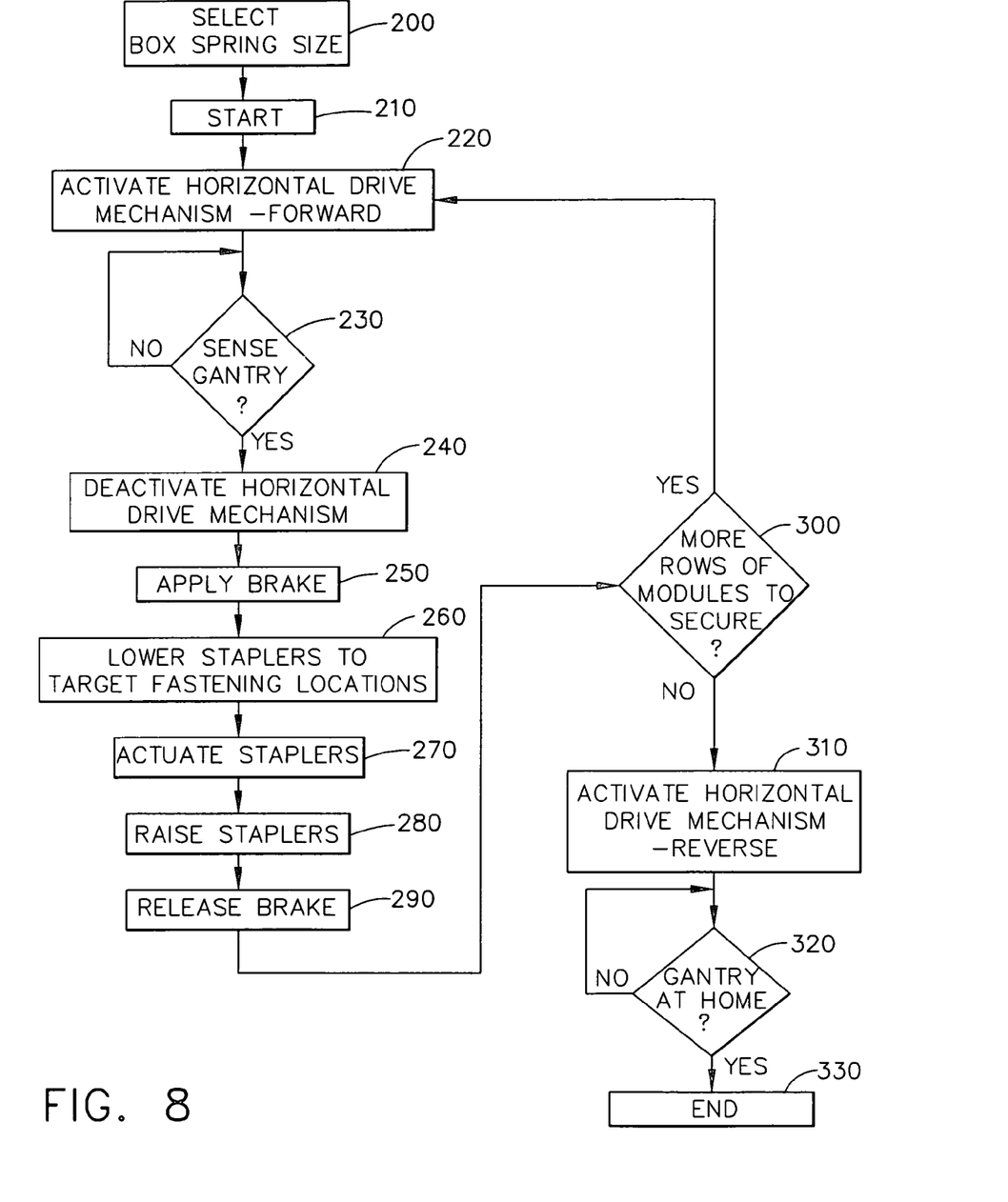
FIG. 8 is a flow chart of steps performed by a control unit during operation of a box spring fastening apparatus.

Details of the different box spring assemblies which may be constructed are stored in the computer of control unit 64. These stored details include the number of active staplers for a given box spring size and which sensors will be active for a given box spring size. In use, an operator will place frame 30 atop base 20 in the desired position by engaging, such as merely contacting, perimeter 34 of fame 30 with each jig 24. The operator will then place spring unit 40 atop frame 30 ensuring borderwire 42 is engaged with each clasp 25 of each jig 24. If needed, the operator will position any inactive staplers 60 so as not to interfere with the assembly of the box spring. Details of the software of control unit 64 for controlling the operation of apparatus 10 are illustrated in FIG. 8. Once frame 30 and spring unit 40 are in place, the operator will select the box spring size to be constructed 200 at control unit 64. Selecting the box spring size to be constructed loads the stored details associated with the box spring size, such as the number of active staplers and which sensors to accept communication from, hereinafter the "active sensors".

Next, the operator will press start to begin the automated operation 210. Horizontal drive mechanism 100 will be activated and move gantry 52 forward from a home position. Gantry 52 will continue to move forward until control unit 64 receives a signal from active sensor as at 230. Upon receiving a signal from an active sensor 110 or 112, control unit 64 will deactivate the horizontal drive mechanism, step 240, and apply brake, step 250, thereby ceasing horizontal movement of gantry 52 such that active staplers 60 are positioned in substantial vertical alignment with corresponding target fastening locations on slat 32 or 32a of frame 30. Once horizontal movement of gantry 52 has ceased, brake 106 may be released or may remain applied until horizontal drive mechanism 100 is again activated. Staplers 60 are then lowered, via activation of vertical drive mechanism 62, to corresponding target fastening locations on the slat, step 260. As staplers 60 are lowered, module adjusters 70 coupled to each stapler 60 will move any misaligned module 45 to a corresponding target fastening location on slat 32 or 32a such that cross-wire 46 of each module 45 is substantially aligned with a target fastening location. Once staplers 60 are lowered to corresponding target fastening locations, the switch at the lowered position of carriage 58 will be triggered and vertical drive mechanism 62 will be deactivated.

Once staplers 60 are at corresponding target fastening locations, each stapler 60 may be activated thereby stapling each module to the slat, step 270. Staplers 60 may be activated sequentially, intermittently, in pairs (adjacent or non-adjacent), simultaneously, or the like. If staplers 60 are activated in a manner other than simultaneously, control unit 64 may be programmed such that the activation of one stapler 60, or set of staplers, and a subsequent stapler 60, or set of staplers, may be separated by a pre-determined amount of time. Alternatively, staplers 60 may be configured to provide feedback to the control unit 64 upon activation such that a subsequent stapler 60, or set of staplers, will not be activated until feedback from a previous stapler 60 has been received.

Once each stapler 60 has been activated, staplers 60 will be raised via vertical drive mechanism 54 until the switch at the raised position is triggered, and control unit 64 then deactivates the vertical drive mechanism, step 280. The brake 106 may then be released, step 290. Based on the box spring size selected, the computer will determine whether another row of modules 44 needs to be secured, step 300, by determining if a signal has been received from each active sensor 110 or 112. If another row 44 needs to be secured, horizontal drive mechanism 100 will be activated and moved forward, step 220, and the process heretofore described repeated. If the computer determines each row of modules 44 has been secured, step 300, i.e. a signal has been received from each active senor 110 or 112, horizontal drive mechanism 100 will be activated in reverse, step 310. Horizontal drive mechanism 100 will remain in reverse until gantry 52 triggers a switch at the home position of gantry 52, step 320. Once gantry 52 is in the home position, horizontal drive mechanism 100 will be deactivated and the program will be complete, step 330.

Having shown and described various embodiments, further adaptations of the methods and systems described herein may be accomplished by appropriate modifications by one of ordinary skill in the art without departing from the scope of the present invention. Several of such potential modifications have been mentioned, and others will be apparent to those skilled in the art. For example, the apparatus may be configured to construct two or more box springs in one cycle where two or more frames are placed next to one another and one spring unit is secured to a respective frame before the gantry returns to a home position. Accordingly, the scope of the present invention should be considered in terms of the following claims and is understood not to be limited to the details of structure and operation shown and described in the specification and drawings.

What is claimed is:

1. A system for securing a spring unit to a frame, the spring unit comprising a plurality of modules arranged in respective rows, the system comprising:
   (a) a base for supporting the frame;
   (b) a framework;
   (c) a plurality of tools coupled to said framework, each tool having an associated module adjuster coupled thereto;

(d) a vertical drive mechanism configured to provide relative vertical movement between the plurality of tools and the base such that each said tool may be disposed between a first vertical position relative to said base and a second vertical position relative to said base;

(e) a horizontal drive mechanism configured to provide relative horizontal movement between the plurality of tools and the base;

(f) each said tool configured to secure, when said tool is disposed at said second vertical position, a respective module of said plurality of modules within each row to a corresponding target location on said frame and each said associated module adjuster configured to align, when said tool is disposed at said second vertical position, said respective module with said corresponding target location;

(g) a control unit configured to control the vertical drive mechanism, the horizontal drive mechanism and each tool, the control unit operable to:

(i) control relative horizontal movement between the plurality of tools and the base such that each tool may be selectively horizontally positioned in substantial vertical alignment with a respective one of the said target locations and the respective module corresponding to said respective target location;

(ii) control relative vertical movement between the plurality of tools and the base so as to move each said tool between said first vertical position relative to said base and said second vertical position relative to said base; and (iii) control the activation of each said tool so as to secure said respective module to said frame at said corresponding target location; and, (h) a plurality of sensors for sensing relative horizontal positions between the plurality of tools and the base, each sensor operable to generate a horizontal position signal upon sensing said relative horizontal positions.

2. The system of claim 1 further comprising a brake coupled to at least one of the framework and the base, the brake in communication with the control unit and operable to cease relative horizontal movement between the plurality of tools and the base based at least in part on communication from the control unit.

3. The system of claim 1 wherein the control unit is configured to activate the tools sequentially.

4. The system of claim 1 wherein the horizontal drive mechanism comprises at least one rodless cylinder.

5. The system of claim 1 wherein the horizontal drive mechanism is configured to provide relative horizontal movement between the plurality of tools and the base substantially perpendicular to said respective rows.

6. The system of claim 1, wherein the framework further comprises a gantry.

7. The system of claim 1 wherein the vertical drive mechanism is coupled to at least one of the framework and the base.

8. The system of claim 1 wherein the horizontal drive mechanism is coupled to at least one of the framework and the base.

9. A system for securing a spring unit to a frame, the spring unit comprising a plurality of modules arranged in respective rows, the system comprising:

(a) a base for supporting the frame;

(b) a framework comprising a gantry;

(c) a plurality of tools coupled to said gantry, each tool having an associated module adjuster coupled thereto;

(d) a vertical drive mechanism coupled to at least one of the gantry and the base, the vertical drive mechanism configured to provide relative vertical movement between the tools and the base such that each said tool may be disposed between a first vertical position relative to said base and a second vertical position relative to said base;

(e) a horizontal drive mechanism coupled to at least one of the gantry and the base, the horizontal drive mechanism configured to provide relative horizontal movement between the tools and the base;

(f) each said tool configured to secure, when said tool is disposed at said second vertical position, a respective module of said plurality of modules within each row to a corresponding target location on said frame and each said associated module adjuster configured to align, when said tool is disposed at said second vertical position, said respective module with said corresponding target location;

(g) a brake coupled to at least one of the gantry and the base, the brake operable to cease relative horizontal movement between the gantry and the base;

(h) a control unit configured to control the vertical drive mechanism, the horizontal drive mechanism, each tool, and the brake, the control unit operable to:

(1) control relative horizontal movement between the gantry and the base such that each tool may be selectively horizontally positioned in substantial vertical alignment with a respective one of the said target locations and the respective module corresponding to said respective target location;

(2) control relative vertical movement between the tools and the base so as to move each said tool between said first vertical position relative to said base and said second vertical position relative to said base; and (3) control the activation of each said tool so as to secure said respective module to said frame at said corresponding target location; and (i) a plurality of sensors for sensing relative horizontal positions between the gantry and the base, each sensor operable to generate a horizontal position signal upon sensing said relative horizontal positions.

10. The system of claim 9 wherein the control unit is configured to activate the tools sequentially.

11. The system of claim 9 wherein the horizontal drive mechanism comprises at least one rodless cylinder.

12. The system of claim 9 wherein each module adjuster further comprises a respective safety shield.

13. The system of claim 9 wherein the horizontal drive mechanism is configured to provide relative horizontal movement between the gantry and the base substantially perpendicular to said respective rows.

14. A system for securing a spring unit to a frame, the spring unit comprising a plurality of modules arranged in respective rows, the system comprising:

(a) a base for supporting the frame;

(b) a framework;

(c) a plurality of tools coupled to said framework, each tool having an associated module adjuster coupled thereto, wherein each module adjuster further comprises a respective safety shield;

(d) a vertical drive mechanism configured to provide relative vertical movement between the plurality of tools and the base such that each said tool may be disposed between a first vertical position relative to said base and a second vertical position relative to said base;

(e) horizontal drive mechanism configured to provide relative horizontal movement between the plurality of tools and the base;

(f) each said tool configured to secure, when said tool is disposed at said second vertical position a respective module of said plurality of modules within each row to a corresponding target location on said frame and each said associated module adjuster configured to align, when said tool is disposed at said second vertical position, said respective module with said corresponding target location;

(g) a control unit configured to control the vertical drive mechanism, the horizontal drive mechanism and each tool, the control unit operable to:

(i) control relative horizontal movement between the plurality of tools and the base such that each tool may be selectively horizontally positioned in substantial vertical alignment with a respective one of the said target locations and the respective module corresponding to said respective target location;

(ii) control relative vertical movement between the plurality of tools and the base so as to move each said tool between said first vertical position relative to said base and said second vertical position relative to said base; and (iii) control the activation of each said tool so as to secure said respective module to said frame at said corresponding target location; and (h) a plurality of sensors for sensing relative horizontal positions between the plurality of tools and the base, each sensor operable to generate a horizontal position signal upon sensing said relative horizontal positions.

15. The system of claim 14 further comprising a brake coupled to at least one of the framework and the base, the brake in communication with the control unit and operable to cease relative horizontal movement between the plurality of tools and the base based at least in part on communication from the control unit.

16. The system of claim 14, wherein the control unit is configured to activate the tools sequentially.

* * * * *